United States Patent
Liu et al.

(10) Patent No.: US 11,055,813 B2
(45) Date of Patent: Jul. 6, 2021

(54) METHOD, ELECTRONIC DEVICE AND COMPUTER PROGRAM PRODUCT FOR EXPANDING MEMORY OF GPU

(71) Applicant: EMC IP Holding Company LLC, Hopkinton, MA (US)

(72) Inventors: Fucai Liu, Beijing (CN); Anzhou Hou, Shanghai (CN); Zhen Jia, Shanghai (CN); Chenxi Hu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/799,104

(22) Filed: Feb. 24, 2020

(65) Prior Publication Data

US 2021/0133918 A1      May 6, 2021

(30) Foreign Application Priority Data

Nov. 1, 2019    (CN) .......................... 201911058577.7

(51) Int. Cl.
*G06F 12/0888*  (2016.01)
*G06F 12/10*    (2016.01)
(Continued)

(52) U.S. Cl.
CPC .............. *G06T 1/60* (2013.01); *G06F 9/5016* (2013.01); *G06F 12/0888* (2013.01);
(Continued)

(58) Field of Classification Search
None
See application file for complete search history.

(56) References Cited

U.S. PATENT DOCUMENTS

| 6,295,068 B1 * | 9/2001 | Peddada | G06T 1/60 |
| | | | 345/419 |
| 7,089,397 B1 * | 8/2006 | Anvin | G06F 12/1054 |
| | | | 711/144 |

(Continued)

OTHER PUBLICATIONS

M. Wolfe, "Unified Memory: The Final Piece of the GPU Programming Puzzle," The Next Platform, https://www.nextplatform.com/2019/01/24/unified-memory-the-final-piece-of-the-gpu-programming-puzzle/, Jan. 24, 2019, 13 pages.

(Continued)

*Primary Examiner* — Joni Hsu
(74) *Attorney, Agent, or Firm* — Ryan, Mason & Lewis, LLP

(57) ABSTRACT

Techniques are disclosed for expanding a memory of a graphics processing unit. For example, a method comprises: receiving, from a graphics processing unit coupled to a host, an indication that data to be accessed by the graphics processing unit is absent in the memory of the graphics processing unit, where the data is stored in a storage device coupled to the host; in response to receiving the indication, determining, from a plurality of candidate paths, a path for migrating the data from the storage device to the memory of the graphics processing unit; causing the data to be migrated from the storage device to the memory of the graphics processing unit via the determined path; and instructing the graphics processing unit to access the data from the memory of the graphics processing unit. As such, a memory of a GPU can be expanded with an external storage device.

20 Claims, 5 Drawing Sheets

(51) Int. Cl.
  *G06T 1/60* (2006.01)
  *G06F 9/50* (2006.01)
  *G06F 13/16* (2006.01)
  *G06T 1/20* (2006.01)
  *G06T 15/00* (2011.01)

(52) U.S. Cl.
  CPC .............. *G06F 12/10* (2013.01); *G06F 13/16* (2013.01); *G06T 1/20* (2013.01); *G06T 15/005* (2013.01)

(56) References Cited

U.S. PATENT DOCUMENTS

| | | | | |
|---|---|---|---|---|
| 8,001,323 | B2* | 8/2011 | Honma | G06F 13/385 |
| | | | | 711/114 |
| 10,198,849 | B1* | 2/2019 | Ashkar | G09G 5/363 |
| 2002/0129196 | A1* | 9/2002 | Volk | G06F 5/10 |
| | | | | 711/105 |
| 2013/0135341 | A1* | 5/2013 | Seetharamaiah | G06T 15/005 |
| | | | | 345/619 |
| 2014/0143505 | A1* | 5/2014 | Sim | G06F 12/0804 |
| | | | | 711/143 |
| 2018/0032435 | A1* | 2/2018 | Parker | G06F 12/0833 |
| 2018/0285261 | A1* | 10/2018 | Mandal | G06F 3/0653 |
| 2019/0303028 | A1* | 10/2019 | Rawal | G06F 3/061 |

OTHER PUBLICATIONS

T. Dettmers, "How to Parallelize Deep Learning on GPUs Part 2/2: Model Parallelism," https://timdettmers.com/2014/11/09/model-parallelism-deep-learning/, Nov. 9, 2014, 16 pages.

A. Jain et al. "Gist: Efficient Data Encoding for Deep Neural Network Training," Project Fiddle, Microsoft Research, Apr. 2018, 14 pages.

* cited by examiner

METHOD, ELECTRONIC DEVICE AND COMPUTER PROGRAM PRODUCT FOR EXPANDING MEMORY OF GPU

RELATED APPLICATION(S)

The present application claims priority to Chinese Patent Application No. 201911058577.7, filed Nov. 1, 2019, and entitled "Method, Electronic Device and Computer Program Product for Expanding Memory of GPU," which is incorporated by reference herein in its entirety.

FIELD

Embodiments of the present disclosure generally relate to the field of data storage, and more specifically, to a method, an electronic device and a computer program product for expanding a memory of a graphics processing unit (GPU).

BACKGROUND

Currently, machine learning and deep learning are widely used. GPUs are one of the most important accelerators in the machine learning and deep learning fields. However, the memory of a GPU may not be enough in many scenarios, for example, in GPU multi-tenant mode, when the number of layers of a deep neural network (DNN) is large, or when processing ultra-high-resolution images (CT-scan image). GPU programmers have to allocate and use GPU memory carefully.

SUMMARY

Embodiments of the present disclosure provide a method, an electronic device and a computer program product for expanding a GPU memory.

In a first aspect of the present disclosure, there is provided a method of expanding a memory of a graphics processing unit. The method comprises: receiving, from a graphics processing unit coupled to a host, an indication that data to be accessed by the graphics processing unit is absent in the memory of the graphics processing unit, where the data is stored in a storage device coupled to the host; in response to receiving the indication, determining, from a plurality of candidate paths, a path for migrating the data from the storage device to the memory of the graphics processing unit; causing the data to be migrated from the storage device to the memory of the graphics processing unit via the determined path; and instructing the graphics processing unit to access the data from the memory of the graphics processing unit.

In a second aspect of the present disclosure, there is provided an electronic device. The device comprises at least one processing unit and at least one memory. The at least one memory is coupled to the at least one processing unit and stores instructions for execution by the at least one processing unit. The instructions, when executed by the at least one processing unit, cause the device to perform acts, the acts comprising: receiving, from a graphics processing unit coupled to a host, an indication that data to be accessed by the graphics processing unit is absent in the memory of the graphics processing unit, where the data is stored in a storage device coupled to the host; in response to receiving the indication, determining, from a plurality of candidate paths, a path for migrating the data from the storage device to the memory of the graphics processing unit; causing the data to be migrated from the storage device to the memory of the graphics processing unit via the determined path; and instructing the graphics processing unit to access the data from the memory of the graphics processing unit.

In a third aspect of the present disclosure, there is provided a computer program product being tangibly stored on a non-transitory computer-readable medium and comprising machine-executable instructions which, when executed by a device, cause the device to perform the method according to the first aspect of the present disclosure.

This Summary is provided to introduce a selection of concepts in a simplified form that are further described below in the Detailed Description. This Summary is not intended to identify each and every key feature or essential feature of the present disclosure, nor is it intended to be used to limit the scope of the present disclosure.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

In the various figures, the same or corresponding reference numerals indicate the same or corresponding parts.

DETAILED DESCRIPTION

Figure 1:
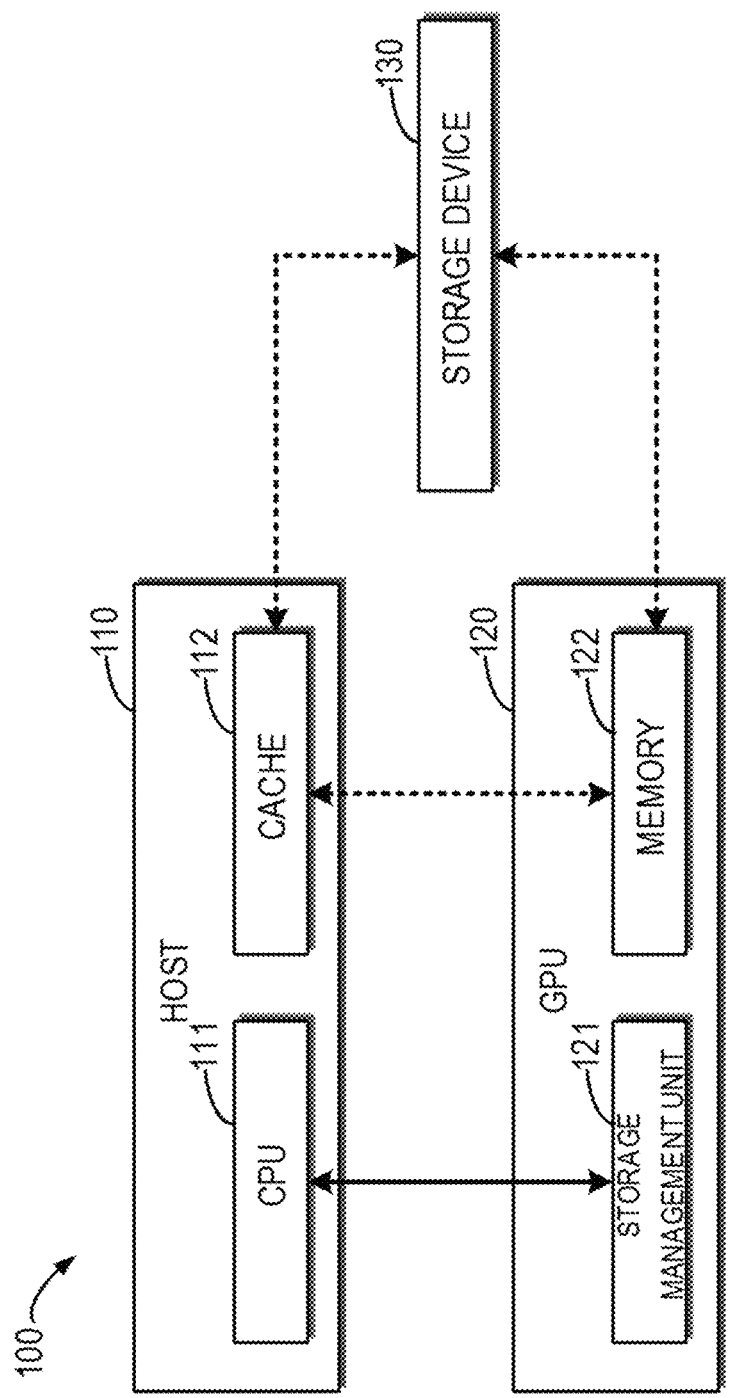
FIG. 1 illustrates a block diagram of an example system in which embodiments of the present disclosure herein can be implemented.

Preferred embodiments of the present disclosure will be described in more detail below with reference to the drawings. Although the drawings illustrate preferred embodiments of the present disclosure, it should be appreciated that the present disclosure can be implemented in various manners and should not be limited to the embodiments explained herein. On the contrary, the embodiments are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "a further embodiment" is to be read as "at least a further embodiment." The terms "first," "second" and so on can refer to the same or different objects. The following text also can include other explicit and implicit definitions.

As described above, machine learning and deep learning are widely used. GPUs are one of the most important accelerators in the machine learning and deep learning fields. However, the memory of GPU may not be enough in many scenarios, for example, in GPU multi-tenant mode, when the number of layers of deep neural networks (DNN) is large, or when processing ultra-high-resolution images (CT-scan image).

In some conventional solutions, model parallelism is used to solve the problem of an insufficient GPU memory. However, such kind of solution is not effective in a GPU multi-tenant mode scenario and in a scenario in which ultra-high-resolution images are processed. In other conventional solutions, data compression and a new deep neural network are used to solve the problem of insufficient memory of GPU. However, this kind of solution introduces greater latency because it requires data decompression operations. There are also some conventional solutions in which a unified memory architecture is used (that is, a host and a GPU share a virtual memory address space) to solve the problem of an insufficient memory of a GPU. However, such scenarios are often limited by the memory size of a host. In addition, there are still some conventional solutions in which the unified memory architecture is used in combination with file input/output (I/O) to solve the problem of an insufficient memory of a GPU. However, such a solution often has poor performance and requires manual memory management.

According to an embodiment of the present disclosure, a solution for expanding a memory of a GPU is proposed. This solution is based on a unified memory architecture and an external storage device is used to expand the memory of the GPU. For example, the external storage device may be one or more solid-state disks (SSDs) that support Non-Volatile Memory Express (NVMe), and the like. When data to be accessed by the GPU is not present in the memory of the GPU, the GPU will trigger a page fault and the indication for the page fault will be captured by a host (for example, a GPU driver). The host may cause the stored data to be migrated from the external storage device to the memory of the GPU through one of a plurality of candidate paths, and then notify the GPU to access the data from the memory of the GPU. In this way, the memory of a GPU can be expanded using an external storage device, and the expansion process is transparent to GPU programmers according to the embodiments of the present disclosure.

Hereinafter, embodiments of the present disclosure will be described in detail with reference to the accompanying drawings. FIG. 1 shows a block diagram of an example system 100 in which embodiments of the present disclosure can be implemented. It should be understood that the structure of the system 100 in FIG. 1 is described only for the purpose of illustration, without suggesting any limitation to the scope of the present disclosure.

As shown in FIG. 1, the system 100 may include a host 110, a GPU 120, and a storage device 130. For example, the host 110 may be a general-purpose computer of X86 architecture or of any other architectures, which may include a CPU 111 and at least one memory, for example, a cache 112. The GPU 120 may be coupled to the host 110 via a Peripheral Component Interconnect Express (PCI-e) interface. The GPU 120 may include a storage management unit (MMU) 121 and a memory 122, where the MMU 121 is used to manage the memory 122 of GPU. The storage device 130 may also be coupled to the host 110 via a PCI-e interface. Examples of the storage device 130 include, but are not limited to, a solid-state disk (SSD) that supports Non-Volatile Memory Express (NVMe), and the like.

The CPU 111 may be run with a GPU driver (not shown in FIG. 1). For example, the GPU 120 may run programs for machine learning or deep learning. When the data to be accessed by the program on the GPU 120 is not in the memory 122 of the GPU, the MMU 121 will trigger a GPU page fault and the indication of the page fault may be captured by the GPU driver running on the CPU 111. For example, data to be accessed by the GPU 120 may be stored in the storage device 130, and in some cases may be read into the host cache 112 for caching. The driver on the CPU 111 may cause the data to be migrated from the storage device 130 or the host cache 112 to the memory 122 of the GPU via one of a plurality of candidate paths. The plurality of candidate paths may include a path for migrating data between the storage device 130 and the memory 122 of the GPU via the cache 112 and a path for migrating data directly between the storage device 130 and the memory 122 of the GPU as indicated by the dotted arrow shown in FIG. 1, for example. Then, the CPU 111 may notify the GPU 120 to access the data from the memory 122 thereof.

Figure 2:
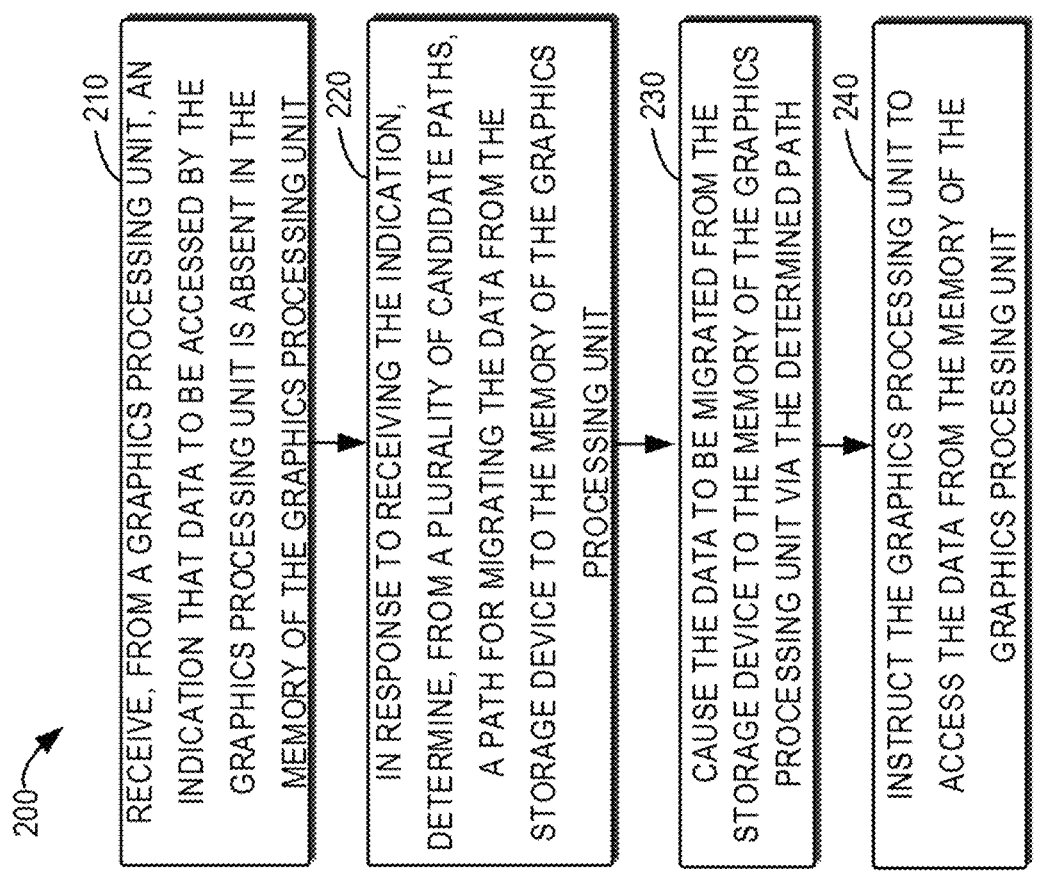
FIG. 2 illustrates a flowchart of an example process for expanding a memory of a GPU according to an embodiment of the present disclosure.

FIG. 2 illustrates a flowchart of an example process 200 for expanding a memory of a GPU according to an embodiment of the present disclosure. For example, the process 200 may be performed at the host 110 as shown in FIG. 1. The process 200 will be described below with reference to FIG. 1. It should be understood that the process 200 may also include additional blocks not shown and/or may omit the blocks shown. The scope of the present disclosure is not limited in this regard.

As shown in FIG. 2, at block 210, the host 110 receives an indication of a page fault from the GPU 120, where the page fault indicates that data to be accessed by the GPU 120 is absent in the memory 122 of the GPU 120. For example, the data to be read by the GPU 120 is absent in the memory 122 of the GPU 120 or the data of a certain address to be modified by the GPU 120 is absent in the memory 122 of the GPU 120. In some embodiments, data to be accessed by the GPU 120 may be stored in the storage device 130, for example, and in some situations, when the data or data near the data is accessed by the host 110, the data may be read to the cache 112 for caching.

At block 220, in response to receiving the indication, the host 110 determines, from a plurality of candidate paths, a path for migrating the data from the storage device 130 to the memory 122 of the GPU.

In some embodiments, the plurality of candidate paths may at least include the first candidate path and the second candidate path. For example, the first candidate path may indicate data migration between the storage device 130 and the memory 122 of the GPU via the cache 112 of the host and the second candidate path may indicate direct data migration between the storage device 130 and the memory 122 of the host without passing the cache 112 of the host. In the present disclosure, the first candidate path is also referred to as a "cache path" and the second candidate path is also referred to as a "point-to-point path" or a "P2P path."

In some embodiments, when the data to be accessed is read-only data or write-only data, the host 110 may select the second candidate path (that is, a P2P path) as the path for migrating the data from the storage device 130 to the memory 122 of the GPU, thereby achieving lower transmission latency. Alternatively, when the data to be accessed is read-write data, the host 110 may select a first candidate path (that is, a cache path) as the path for migrating the data from the storage device 130 to the memory 122 of the GPU, thereby achieving a higher transmission bandwidth.

At block 230, the host 110 causes data to be migrated from the storage device 130 to the memory 122 of the GPU via the determined path. Then, at block 240, in response to the data being migrated to the memory 122 of the GPU, the host 110 may instruct the GPU 120 to access the data from the memory 122 of the GPU.

Figure 3:
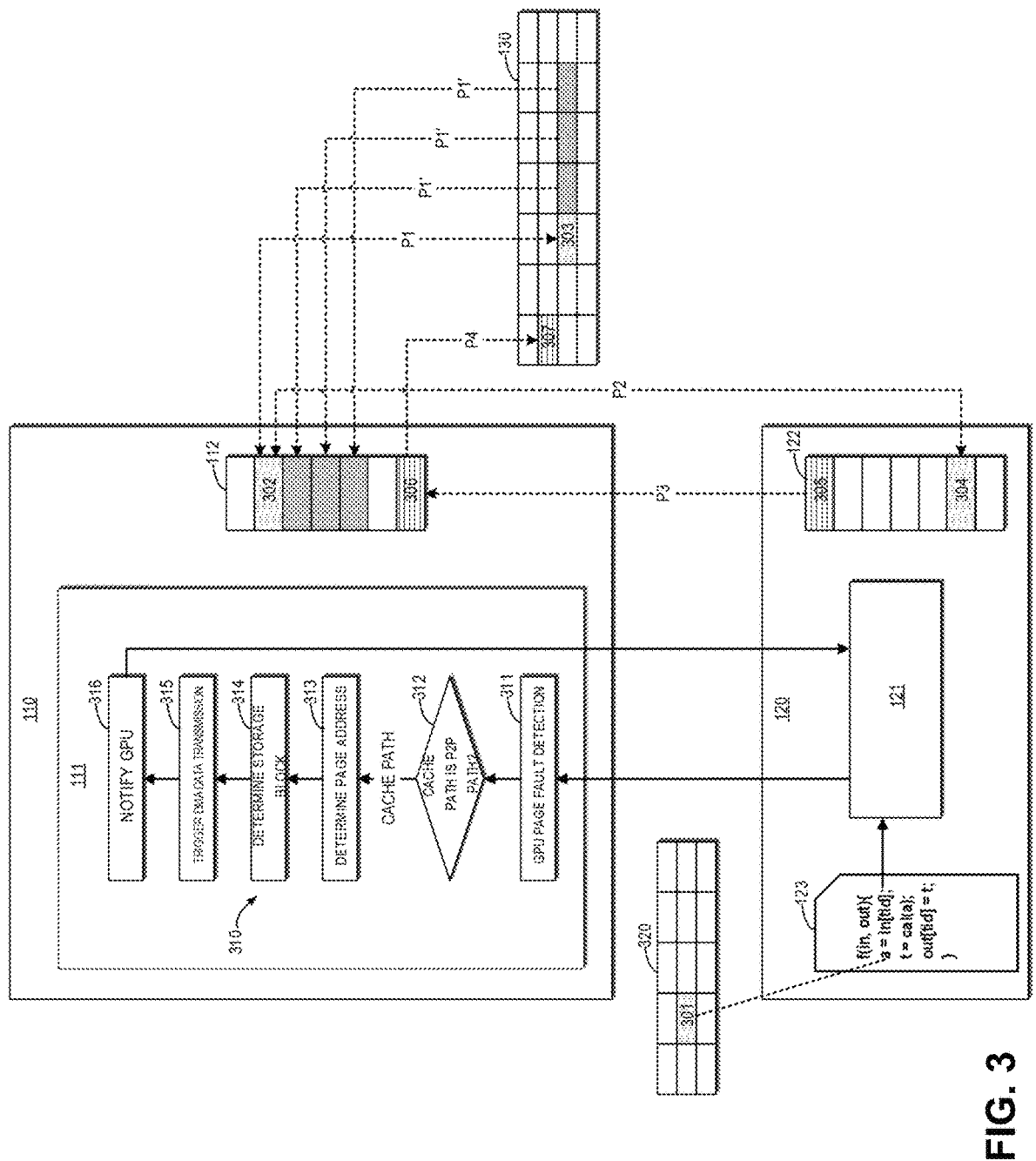
FIG. 3 illustrates a schematic diagram of migrating data between a storage device and a memory of a GPU via a cache of a host according to an embodiment of the present disclosure.

FIG. 3 illustrates a schematic diagram of migrating data between a storage device and a memory of a GPU via a cache path according to an embodiment of the present disclosure.

As shown in FIG. 3, a program 123 running in the GPU 120 includes, for example, a statement "a=in [tid]", which intends to access the data at a virtual address 301 in a virtual address space 320 shared by the host 110 and the GPU 120. When the MMU 121 detects that the data is absent in the memory 122 of the GPU, the MMU 121 may trigger a GPU page fault and an indication of the GPU page fault may be captured by the host 110 (e.g., a GPU driver running on the CPU 111). The host 110 may thus perform the process 310 shown in FIG. 3. In some embodiments, the process 310 may be performed by a GPU driver running on the CPU 111, for example.

The host 110 may receive 311 an indication of GPU page fault from the GPU 120. In response to receiving the indication, the host 110 may determine 312 whether a cache path or a P2P path is utilized to migrate the data from the storage device 130 to the memory 122 of the GPU. It is assumed herein that the data to be accessed is read-write data. As described above, the host 110 may select a cache path as a path for migrating the data from the storage device 130 to the memory 122 of the GPU, thereby achieving a higher transmission bandwidth.

In response to the cache path being selected, the host 110 may determine 313 the page address corresponding to the virtual address 301 in the cache 112, for example, the page address 302 shown in FIG. 3. In some embodiments, the mapping relationship between the virtual address and the host cache address may be predetermined and may be maintained by the host 110. The host 110 may determine the page address 302 corresponding to the virtual address 301 based on the mapping relationship.

In some embodiments, when the required data is not cached at the page address 302 or the cached data is dirty data (that is, inconsistent with the data stored in the storage device 130), the host 110 may read the data from the corresponding position 303 in the storage device (as shown by the dashed arrow P1 in FIG. 3) and cache the data at the page address 302. Additionally or alternatively, in some embodiments, when the data at the location 303 in the storage device is read to the cache 112, data near the location 303 may also be read into the cache 112 in advance (as shown by the dashed arrows P1' in FIG. 3) for subsequent access. The mechanism of reading in advance facilitates an improvement of the hit rate of the cache 112.

Then, the host 110 may determine 314 a storage block in the memory 122 of the GPU for storing the data. In some embodiments, as shown in FIG. 3, the memory 122 of the GPU may be divided into a plurality of storage blocks. The host 110 may determine whether an unused storage block is present in the plurality of storage blocks. If there is an unused storage block (for example, storage block 304), the host 110 may determine the unused storage block as the storage block to be used to store the data (as shown by the dashed arrow P2 in FIG. 3). Alternatively, in some embodiments, if the host 110 determines that the plurality of storage blocks in the memory 122 of the GPU is all used, the host 110 may cause the data in the used storage blocks of the plurality of storage blocks to be migrated to the cache 112 of the host, and then the used storage block is determined as a storage block to be used to store the data. For example, in FIG. 3, in the scenario in which all the storage blocks in the memory 122 of the GPU are used, the data in the used storage block 305 can be migrated to the page address 306 in the cache 112 of the host (as shown by the dashed arrow P3 in FIG. 3) and then is written back to the corresponding position 307 in the storage device 130 (as shown by the dashed arrow P4 in FIG. 3).

In response to the storage block for storing the data being determined, the host 110 may trigger 315 a DMA data transmission, causing the GPU 120 to migrate the data from the page address 302 in the cache 112 to the determined storage block via a direct memory access (DMA) (e.g., storage block 304 or 305). Then, the host 110 may notify 316 the GPU 120 to access the data from the memory 122 of the GPU (e.g., read or modify the data).

Figure 4:
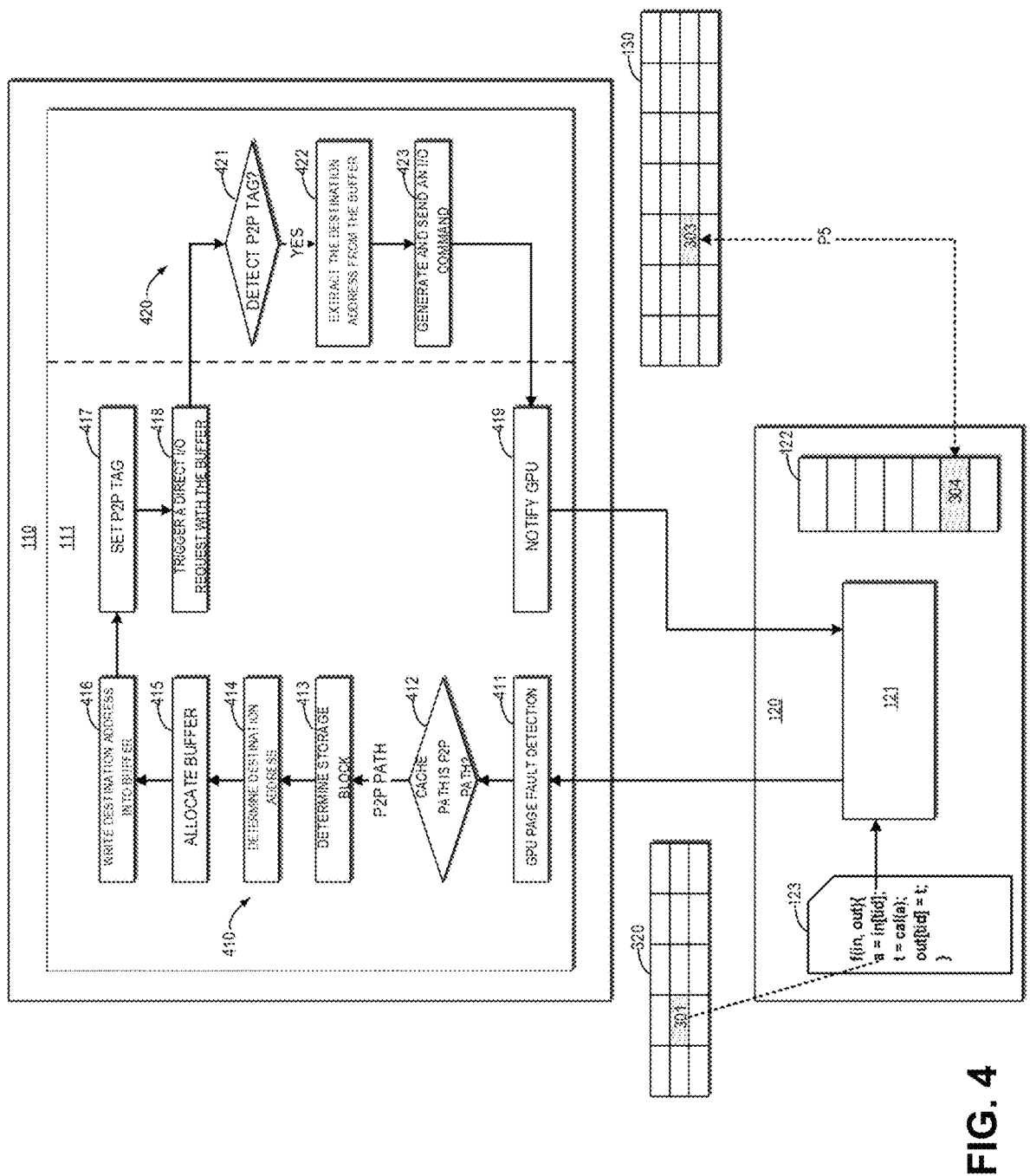
FIG. 4 shows a schematic diagram of migrating data directly between a storage device and a memory of a GPU without passing a cache of a host according to an embodiment of the present disclosure.

FIG. 4 shows a schematic diagram of migrating data between a storage device and a memory of a GPU via a P2P path according to an embodiment of the present disclosure.

As shown in FIG. 4, the program 123 running in the GPU 120 includes, for example, a statement "a=in [tid]", which intends to access data at the virtual address 301 in the virtual address space 320 shared by the host 110 and the GPU 120. When the MMU 121 detects that the data is absent in the memory 122 of the GPU, the MMU 121 may trigger a GPU page fault and an indication of the GPU page fault may be captured by the host 110 (e.g., a GPU driver running on the CPU 111). The host 110 may thus perform the process 410 as shown in FIG. 4. In some embodiments, the process 410 may be performed by a GPU driver running on the CPU 111, for example.

The host 110 may receive 411 an indication of a GPU page fault from the GPU 120. In response to receiving the indication, the host 110 may determine 412 whether to utilize a cache path or a P2P path at 412 to migrate the data in the storage device 130 to the GPU memory 122. It is assumed herein that the data to be accessed is read-only or write-only data. As described above, the host 110 may select a P2P path as a path to migrate the data from the storage device 130 to the GPU memory 122 of the GPU, thereby achieving lower transmission latency.

In response to the P2P path being selected, the host 110 may determine 413 a storage block in the GPU memory 122 for storing the data. The action 413 of determining the storage block may be similar to the action 314 shown in FIG. 3, which is not described herein again. For example, the determined storage block is the storage block 304 shown in FIG. 4. Then, based on the determined storage block 304, the host 110 may determine 414 the destination address (e.g., the bus address of the GPU memory) to which the data is to be migrated.

In response to determining the destination address, the host 110 may allocate 415 a buffer in the host memory and write 416 the destination address into the allocated buffer. The reason for allocating an area buffer in the memory of the host is that subsequent direct I/O requests usually require that the destination buffer reside in the local memory of the host and the buffer in a memory of the GPU is often not supported. In addition, the host 110 needs to set 417 a P2P tag associated with the buffer at a location (e.g., a page table) visible to the driver (e.g., an NVMe driver) of the storage device 130 to indicate that the buffer is not a real destination buffer but a buffer storing with a destination address. As will be described below, the driver of the storage device 130 will perform special processing on the buffer based on detecting the P2P tag.

As shown in FIG. 4, in response to the P2P tag being set, the host 110 may initiate 418 a direct I/O request to the driver of the storage device 130 by using a buffer storing with a destination address. In response to receiving the direct I/O request, the driver of the storage device 130 may perform the process 420 as shown in FIG. 4. For example, the driver may detect 421 whether a P2P tag is set. In response to determining that the P2P tag is set, the driver may extract 422 the destination address from the buffer of the direct I/O request. Then, the driver may generate an I/O command based on the destination address and send 423 it to the storage device 130. In response to the I/O command, the storage device 130 will migrate the data from the location 303 to the storage block 304 in the memory 122 of the GPU via DMA (as shown by the dashed arrow P5 in FIG. 4). Then, the host 110 may notify 419 the GPU 120 to access the data from the memory 122 of GPU (e.g., read or modify the data).

As can be seen from the above description, a solution for expanding a memory of a GPU is proposed according to an embodiment of the present disclosure. This solution is based on a unified memory architecture and expanding the memory of the GPU by using an external storage device and the external storage device are, for example, solid-state disks (SSD) that support the non-volatile memory express (NVMe). When the data to be accessed is not in the memory of the GPU, a GPU page fault is triggered and an indication of the page fault is captured by a host (for example, a GPU driver). The host may cause the data stored in the external storage device to be migrated to the memory of the GPU through one of a plurality of candidate paths, and then notify the GPU to access the data from the memory of the GPU. In this way, according to the embodiments of the present disclosure, the memory of the GPU can be expanded using an external storage device, and the expansion process is transparent to GPU programmers.

Figure 5:
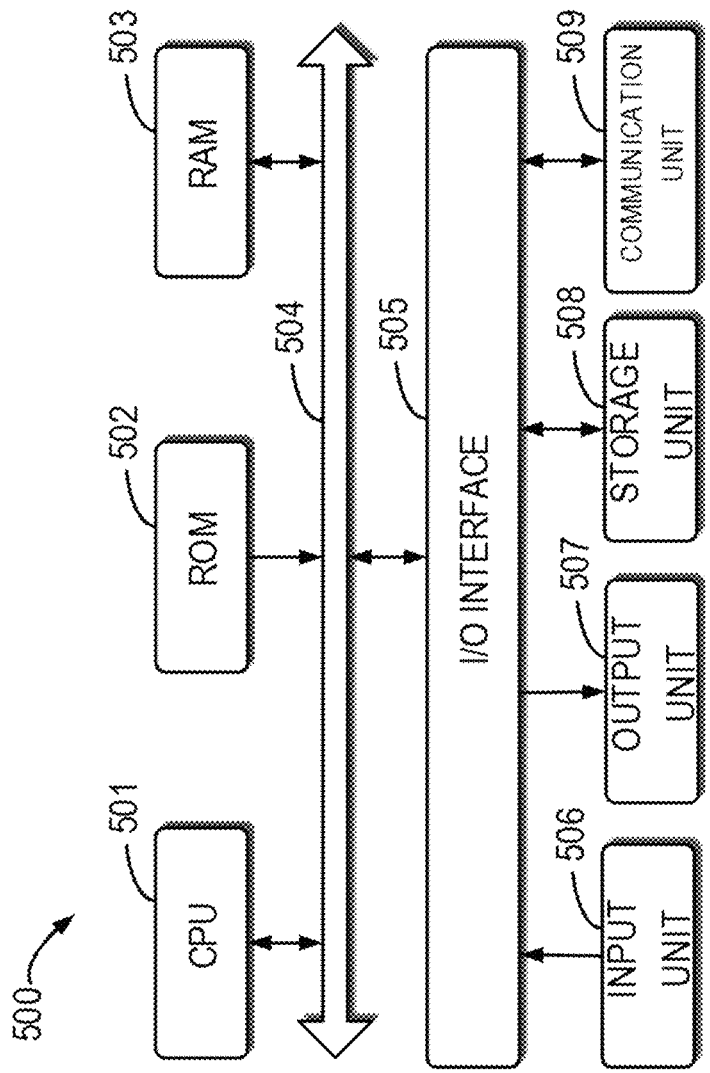
FIG. 5 illustrates a schematic block diagram of an example device for implementing embodiments of the present disclosure.

FIG. 5 illustrates a schematic block diagram of an example device 500 for implementing embodiments of the present disclosure. For example, the host 110 shown in FIG. 1 can be implemented by the device 500. As shown, the device 500 includes a central processing unit (CPU) 501, which can execute various suitable actions and processing based on the computer program instructions stored in the read-only memory (ROM) 502 or computer program instructions loaded in a random-access memory (RAM) 503 from a storage page 508. The RAM 503 may also store all kinds of programs and data required by the operations of the device 500. The CPU 501, ROM 502 and RAM 503 are connected to each other via a bus 504. The input/output (I/O) interface 505 is also connected to the bus 504.

A plurality of components in the device 500 is connected to the I/O interface 505, including: an input unit 506, such as a keyboard, a mouse and the like; an output unit 507, e.g., various kinds of displays and loudspeakers etc.; a storage page 508, such as a magnetic disk and an optical disk etc.; and a communication unit 509, such as a network card, a modem, a wireless transceiver, and the like. The communication unit 509 allows the device 500 to exchange information/data with other devices via a computer network, such as Internet, and/or various telecommunication networks.

The above described procedure and processing, such as the processes 200, 310, 410 and/or 420 can also be executed by the processing unit 501. For example, in some embodiments, the processes 200, 310, 410 and/or 420 can be implemented as a computer software program tangibly included in the machine-readable medium, e.g., the storage page 508. In some embodiments, the computer program may be partially or fully loaded and/or mounted to the device 500 via the ROM 502 and/or communication unit 509. When the computer program is loaded to the RAM 503 and executed by the CPU 501, one or more steps of the above described progresses 200, 310, 410 and/or 420 can be implemented.

The present disclosure can be a method, a device, a system and/or a computer program product. The computer program product may include a computer-readable storage medium, on which the computer-readable program instructions for executing various aspects of the present disclosure are loaded.

The computer-readable storage medium may be a tangible apparatus that maintains and stores instructions utilized by the instruction executing apparatuses. The computer-readable storage medium may be, but not limited to, an electrical storage device, a magnetic storage device, an optical storage device, an electromagnetic storage device, a semiconductor storage device or any appropriate combinations of the above. More concrete examples of the computer-readable storage medium (non-exhaustive list) include: a portable computer disk, a hard disk, a random-access memory (RAM), a read-only memory (ROM), an erasable programmable read-only memory (EPROM or flash), a static random-access memory (SRAM), a portable compact disk read-only memory (CD-ROM), a digital versatile disk (DVD), a memory stick, a floppy disk, mechanical coding devices, a punched card stored with instructions thereon, or a projection in a slot, and any appropriate combinations of the above. The computer-readable storage medium utilized herein is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instructions may be downloaded from the computer-readable storage medium to each computing/processing device, or to an external computer or external storage via Internet, local area network, wide area network and/or wireless network. The network may include a copper-transmitted cable, an optical fiber transmission, a wireless transmission, a router, a firewall, a switch, a network gate computer and/or an edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combination of one or more programming languages, where the programming languages include object-oriented programming languages, e.g., Smalltalk, C++, and so on, and traditional procedural programming languages, such as "C" language or similar programming languages. The computer-readable program instructions may be implemented fully on the user computer, partially on the user computer, as an independent software package, partially on the user computer and partially on the remote computer, or completely on the remote computer or server. In the case where remote computer is involved, the remote computer may be connected to a user computer via any type of networks, including local area network (LAN) and wide area network (WAN), or to the external computer (e.g., connected via Internet using the Internet service provider). In some embodiments, state information of the computer-readable program instructions is used to customize an electronic circuit, e.g., a programmable logic circuit, a field programmable gate array (FPGA) or a programmable logic array (PLA). The electronic circuit may execute computer-readable program instructions to implement various aspects of the present disclosure.

Various aspects of the present disclosure are described herein with reference to flow chart and/or block diagram of the method, device (system) and computer program products according to embodiments of the present disclosure. It should be understood that each block of the flow chart and/or block diagram and the combination of various blocks in the flow chart and/or block diagram may be implemented by computer-readable program instructions.

The computer-readable program instructions may be provided to the processing unit of a general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions may also be loaded into a computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by the system, method and computer program product according to multiple implementations of the present disclosure. In this regard, each block in the flow chart or block diagram may represent a module, a part of a program segment or code, where the module and the part of program segment or code include one or more executable instructions for performing stipulated logic functions. In some alternative implementations, it should be noted that the functions indicated in the block may also take place in an order different from the one indicated in the drawings. For example, two successive blocks may be in fact executed in parallel or sometimes in a reverse order depending on the involved functions. It should also be noted that each block in the block diagram and/or flow chart and combinations of the blocks in the block diagram and/or flow chart may be implemented by a hardware-based system exclusive for executing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the explained various implementations, are straightforward for those skilled in the art. The selection of terms in the text aims to best explain principles and actual applications of each implementation and technical improvements made in the market by each embodiment, or enable others of ordinary skill in the art to understand implementations of the present disclosure.

What is claimed is:

1. A method of expanding a memory implemented within a graphics processing unit comprising:
   receiving, from a graphics processing unit coupled to a host, an indication that data to be accessed by the graphics processing unit is absent in a memory implemented within the graphics processing unit, the data being stored in a storage device coupled to the host;
   in response to receiving the indication, determining, from a plurality of candidate paths, a path for migrating the data from the storage device to the memory implemented within the graphics processing unit;
   causing the data to be migrated from the storage device to the memory implemented within the graphics processing unit via the determined path; and
   instructing the graphics processing unit to access the data from the memory ef implemented within the graphics processing unit;
   wherein the plurality of candidate paths comprises a first candidate path and a second candidate path, the first candidate path indicating a data migration between the storage device and the memory implemented within the graphics processing unit via a cache implemented within the host, and the second candidate path indicating a direct data migration between the storage device and the memory implemented within the graphics processing unit.

2. The method of claim 1, wherein determining the path comprises:
   in response to determining that the data is read-only data or write-only data, determining the second candidate path as the path.

3. The method of claim 1, wherein determining the path comprises:
   in response to determining that the data is read-write data, determining the first candidate path as the path.

4. The method of claim 1, wherein causing the data to be migrated from the storage device to the memory implemented within the graphics processing unit via the determined path comprises:
   in response to the first candidate path being determined as the path,
      determining, in the cache, a page address corresponding to a virtual address of the data to be accessed by the graphics processing unit, wherein the data in the storage device is to be cached in the page address;
      determining, from the memory implemented within the graphics processing unit, a storage block for storing the data; and
      causing the data to be migrated from the page address in the cache to the storage block.

5. The method of claim 4, wherein the memory implemented within the graphics processing unit comprises a plurality of storage blocks and determining the storage block comprises:

in response to determining that an unused storage block is present in the plurality of storage blocks, determining the unused storage block as the storage block for storing the data.

6. The method of claim 4, wherein the memory implemented within the graphics processing unit comprises a plurality of storage blocks, and determining the storage block comprises:
in response to determining that an unused storage block is absent in the plurality of storage blocks, causing data in a used storage block of the plurality of storage blocks to be migrated to the cache; and
determining the used storage block as the storage block for storing the data.

7. The method of claim 4, wherein causing the data to be migrated from the page address in the cache to the storage block comprises:
causing the graphics processing unit to migrate the data from the page address in the cache to the storage block via Direct Memory Access (DMA).

8. The method of claim 1, wherein causing the data to be migrated from the storage device to the memory implemented within the graphics processing unit via the determined path comprises:
in response to the second candidate path being determined as the path,
determining, from the memory implemented within the graphics processing unit, a storage block for storing the data;
determining, based on the storage block, a destination address to which the data is to be migrated; and
indicating the destination address to the storage device so that the storage device migrates the data to the destination address.

9. The method of claim 8, wherein indicating the destination address to the storage device comprises:
allocating a buffer from a memory of the host;
storing the destination address in the buffer; and
sending a direct I/O request to a driver of the storage device based on the buffer, such that the driver, in response to receiving the direct I/O request, extracts the destination address from the buffer and sends an I/O command generated based on the destination address to the storage device.

10. The method of claim 8, wherein the storage device migrates the data to the destination address via Direct Memory Access (DMA).

11. The method of claim 1, wherein the storage device comprises a solid-state disk supporting Non-Volatile Memory Express (NVMe).

12. The method of claim 1, wherein the graphics processing unit and the storage device are coupled to the host via Peripheral Component Interconnect Express (PCI-e) interfaces respectively.

13. An electronic device, comprising:
at least one processing unit;
at least one memory coupled to the at least one processing unit and storing instructions for execution by the at least one processing unit, the instructions, when executed by the at least one processing unit, causing the device to perform acts comprising:
receiving, from a graphics processing unit coupled to a host, an indication that data to be accessed by the graphics processing unit is absent in the memory implemented within the graphics processing unit, the data being stored in a storage device coupled to the host;
in response to receiving the indication, determining, from a plurality of candidate paths, a path for migrating the data from the storage device to the memory implemented within the graphics processing unit;
causing the data to be migrated from the storage device to the memory implemented within the graphics processing unit via the determined path; and
instructing the graphics processing unit to access the data from the memory implemented within the graphics processing unit;
wherein the plurality of candidate paths comprises a first candidate path and a second candidate path, the first candidate path indicating a data migration between the storage device and the memory implemented within the graphics processing unit via a cache implemented within the host, and the second candidate path indicating a direct data migration between the storage device and the memory implemented within the graphics processing unit.

14. The device of claim 13, wherein determining the path comprises:
in response to determining that the data is read-only data or write-only data, determining the second candidate path as the path.

15. The device of claim 13, wherein determining the path comprises:
in response to determining that the data is read-write data, determining the first candidate path as the path.

16. The device of claim 13, wherein causing the data to be migrated from the storage device to the memory implemented within the graphics processing unit via the determined path comprises:
in response to the first candidate path being determined as the path,
determining, in the cache, a page address corresponding to a virtual address of the data to be accessed by the graphics processing unit, wherein the data in the storage device is to be cached in the page address;
determining, from the memory implemented within the graphics processing unit, a storage block for storing the data in; and
causing the data to be migrated from the page address in the cache to the storage block.

17. The device of claim 13, wherein causing the data to be migrated from the storage device to the memory implemented within the graphics processing unit via the determined path comprises:
in response to the second candidate path being determined as the path,
determining, from the memory implemented within the graphics processing unit, a storage block for storing the data;
determining, based on the storage block, a destination address to which the data is to be migrated; and
indicating the destination address to the storage device so that the storage device migrates the data to the destination address.

18. A computer program product being tangibly stored on a non-transitory computer-readable medium and comprising machine-executable instructions which, when executed by a device, cause the device to perform steps of:
receiving, from a graphics processing unit coupled to a host, an indication that data to be accessed by the graphics processing unit is absent in a memory implemented within the graphics processing unit, the data being stored in a storage device coupled to the host;

in response to receiving the indication, determining, from a plurality of candidate paths, a path for migrating the data from the storage device to the memory implemented within the graphics processing unit;

causing the data to be migrated from the storage device to the memory implemented within the graphics processing unit via the determined path; and instructing the graphics processing unit to access the data from the memory implemented within the graphics processing unit;

wherein the plurality of candidate paths comprises a first candidate path and a second candidate path, the first candidate path indicating a data migration between the storage device and the memory implemented within the graphics processing unit via a cache implemented within the host, and the second candidate path indicating a direct data migration between the storage device and the memory implemented within the graphics processing unit.

19. The computer program product of claim 18, wherein causing the data to be migrated from the storage device to the memory implemented within the graphics processing unit via the determined path comprises:

in response to the first candidate path being determined as the path,
- determining, in the cache, a page address corresponding to a virtual address of the data to be accessed by the graphics processing unit, wherein the data in the storage device is to be cached in the page address;
- determining, from the memory implemented within the graphics processing unit, a storage block for storing the data; and
- causing the data to be migrated from the page address in the cache to the storage block.

20. The computer program product of claim 18, wherein causing the data to be migrated from the storage device to the memory implemented within the graphics processing unit via the determined path comprises:

in response to the second candidate path being determined as the path,
- determining, from the memory implemented within the graphics processing unit, a storage block for storing the data;
- determining, based on the storage block, a destination address to which the data is to be migrated; and
- indicating the destination address to the storage device so that the storage device migrates the data to the destination address.

* * * * *

UNITED STATES PATENT AND TRADEMARK OFFICE
CERTIFICATE OF CORRECTION

PATENT NO. : 11,055,813 B2
APPLICATION NO. : 16/799104
DATED : July 6, 2021
INVENTOR(S) : Fucai Liu et al.

Page 1 of 1

It is certified that error appears in the above-identified patent and that said Letters Patent is hereby corrected as shown below:

In the Claims

Claim 1, Column 10, Line 29, please delete "the memory ef implemented" and insert therefor --the memory implemented--

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*